US012771631B2

(12) United States Patent
Ogura et al.

(10) Patent No.: US 12,771,631 B2
(45) Date of Patent: Oct. 20, 2026

(54) WIRELESS APPARATUS, COMMUNICATION SYSTEM, ROUTE COST CALCULATION METHOD, AND STORAGE MEDIUM

(71) Applicant: KABUSHIKI KAISHA TOSHIBA, Tokyo (JP)

(72) Inventors: Miyuki Ogura, Tokyo (JP); Toshihisa Nabetani, Kawasaki Kanagawa (JP); Masahiro Sekiya, Tokyo (JP); Takaomi Murakami, Kamakura Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 295 days.

(21) Appl. No.: 18/589,796

(22) Filed: Feb. 28, 2024

(65) Prior Publication Data

US 2025/0030624 A1 Jan. 23, 2025

(30) Foreign Application Priority Data

Jul. 21, 2023 (JP) ................................ 2023-119018

(51) Int. Cl.

*H04L 45/122* (2022.01)
*H04W 40/02* (2009.01)
*H04W 40/24* (2009.01)

(52) U.S. Cl.

CPC ......... *H04L 45/122* (2013.01); *H04W 40/026* (2013.01); *H04W 40/246* (2013.01); *H04W 40/248* (2013.01)

(58) Field of Classification Search

CPC .............. H04L 45/122; H04W 40/026; H04W 40/246; H04W 40/248

See application file for complete search history.

(56) References Cited

U.S. PATENT DOCUMENTS

2011/0063980 A1* 3/2011 Kondo .................. H04L 45/128 370/235
2011/0235504 A1* 9/2011 Nozaki ................. H04W 40/30 370/242
2020/0305052 A1 9/2020 Yoshino et al.

FOREIGN PATENT DOCUMENTS

JP 2008135914 A 6/2008
JP 2011205556 A 10/2011
JP 2018015262 A 2/2018

(Continued)

OTHER PUBLICATIONS

Japanese Office Action (and an English language translation thereof) dated Jan. 20, 2026, issued in counterpart Japanese Application No. 2023-119018.

*Primary Examiner* — Chae S Lee

(74) *Attorney, Agent, or Firm* — Holtz, Holtz & Volek PC

(57) ABSTRACT

According to one embodiment, a wireless apparatus calculates a route cost between a first other apparatus and an own apparatus in accordance with the number of hops, which is the number of relays of wireless signals by a second other apparatus, and a movement cost, which reflects a cumulative value of movement states of the own apparatus. The wireless apparatus transmits first route cost information on the route cost to a third other apparatus that is selecting a connection destination for wireless communication with the first other apparatus. The wireless apparatus calculates the movement cost at a first time, based on the speed of the own apparatus at the first time and the movement cost at a time before the first time.

15 Claims, 8 Drawing Sheets

(56) References Cited

FOREIGN PATENT DOCUMENTS

| | | | | |
|---|---|---|---|---|
| JP | 2019054457 | A | | 4/2019 |
| JP | 2019134315 | A | | 8/2019 |
| JP | 2020025193 | A | | 2/2020 |
| JP | 2022092974 | A | * | 6/2022 |

* cited by examiner

| Time | Movement cost $m_t$ |
|---|---|
| Ta | 1 |
| Tb | 1.2 |
| Tc | 1.4 |
| Td | 1.6 |

Mobile station movement cost calculation case 1 ($\omega_t = 0.2$)

FIG. 4

| Time | Movement cost $m_t$ |
|---|---|
| Ta | 1 |
| Tb | 1.8 |
| Tc | 2.6 |
| Td | 3.2 |

Mobile station movement cost calculation case 2 ($\omega_t = 0.8$)

FIG. 5

| Time | Movement cost $m_t$ |
|---|---|
| Ta | -1 |
| Tb | -1.2 |
| Tc | -1.4 |
| Td | -1.6 |

Mobile station movement cost calculation case 3 ($\omega_t = 0.2$)

FIG. 6

| Time | Movement cost $m_t$ |
|---|---|
| Ta | -1 |
| Tb | -1.8 |
| Tc | -2.6 |
| Td | -3.2 |

Mobile station movement cost calculation case 4 ($\omega_t = 0.8$)

FIG. 7

WIRELESS APPARATUS, COMMUNICATION SYSTEM, ROUTE COST CALCULATION METHOD, AND STORAGE MEDIUM

CROSS-REFERENCE TO RELATED APPLICATIONS

This application is based upon and claims the benefit of priority from Japanese Patent Application No. 2023-119018, filed Jul. 21, 2023, the entire contents of which are incorporated herein by reference.

FIELD

Embodiments described herein relate generally to a wireless apparatus, a communication system, a route cost calculation method, and a storage medium.

BACKGROUND

A method of reflecting a moving speed in a route cost, for a wireless apparatus which forms a mesh network together with the other wireless apparatuses, is known (for example, Patent Literature 1: JP 2008-135914 A).

For example, Patent Literature 2 (JP 2011-205556 A) discloses a method of setting a link cost corresponding to each of elements of a moving speed and a received power value in advance as a table and deriving a route cost using the table.

In the method of Patent Literature 1, the route cost does not include persistence of the moving speed of the wireless apparatus. Therefore, when the wireless apparatus repeatedly stops and moves, the amount of temporal variation in the route cost may become large, and the calculated route cost may be inconsistent with the actual operation.

In addition, in the method of Patent Literature 2, the route cost corresponding to each of the elements of the moving speed and the received power value needs to be set in advance as the table.

BRIEF DESCRIPTION OF THE DRAWINGS

FIG. 4 is a table showing a first example of the movement cost calculated by the wireless apparatus of the first embodiment.

FIG. 5 is a table showing a second example of the movement cost calculated by the wireless apparatus of the first embodiment.

FIG. 6 is a table showing a third example of the movement cost calculated by the wireless apparatus of the first embodiment.

FIG. 7 is a table showing a fourth example of the movement cost calculated by the wireless apparatus of the first embodiment.

DETAILED DESCRIPTION

In general, according to one embodiment, a wireless apparatus includes a processing unit, and a communication unit. The processing unit calculates a route cost between a first other wireless apparatus and an own wireless apparatus in accordance with the number of hops and a movement cost. The number of hops is the number of relays of wireless signals by a second other wireless apparatus that can intervene as a wireless repeater between a first other wireless apparatus operating as a gateway terminal and an own wireless apparatus operating as a wireless terminal. The movement cost reflects a cumulative value of movement states of the own wireless apparatus. The communication unit transmits first route cost information on the route cost to a third other wireless apparatus that is selecting a connection destination for wireless communication with the first other wireless apparatus. The processing unit calculates the movement cost at a first time, based on the speed of the own wireless apparatus at the first time and the movement cost at a time before the first time.

Embodiments will be described hereinafter with reference to the accompanying drawings.

First Embodiment

First, a first embodiment will be described.

Figure 1:
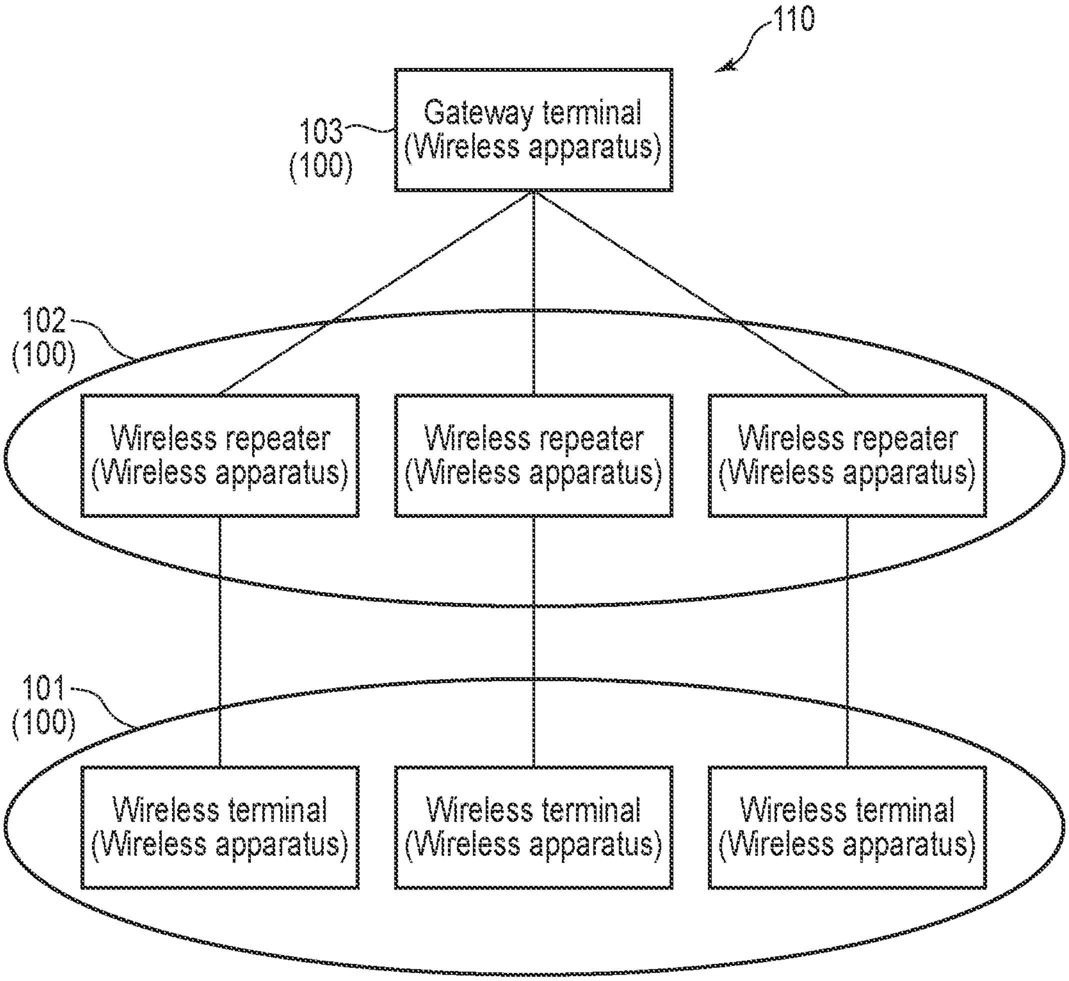
FIG. 1 is a diagram showing an example of formation of a wireless network using a plurality of wireless apparatuses in a communication system of a first embodiment.

FIG. 1 is a diagram showing an example of formation of a wireless network 110 using a plurality of wireless apparatuses 100 in a communication system of a first embodiment.

The wireless network 110 is formed by a plurality of wireless apparatuses 100 making wireless communication with each other. The plurality of wireless apparatuses 100 forming the wireless network 110 can be classified into gateway terminals, wireless repeaters, and wireless terminals according to their roles in the wireless network 110. In the following descriptions, the wireless apparatus 100 which plays a role of a gateway terminal may be referred to as a gateway terminal 103, the wireless apparatus 100 which plays a role of a wireless repeater may be referred to as a wireless repeater 102, and the wireless apparatus 100 which plays a role of a wireless terminal may be referred to as a wireless terminal 101.

The gateway terminal 103 exists primarily to collect data transmitted from all wireless apparatuses 100 in the wireless network 110 and transfer the data to a server (external server) located outside the wireless network 110. For this reason, the gateway terminal 103 comprises a connector for connecting an Ethernet™ cable or the like, and transfers the collected data to a server installed on the Internet or an intranet using a wired cable connected to the connector.

The form of connection between the gateway terminal 103 and the server installed on the Internet or intranet may be wireless communication.

The wireless repeater 102 makes communication of its own data with the external server via the gateway terminal 103 and relays the data from the other wireless apparatus 100 on the same route as the own wireless apparatus in the wireless network 110.

The wireless terminal 101 is the wireless apparatus 100 farthest from the gateway terminal 103 in the route formed in the wireless network 110 and makes communication of its own data to the external server via the gateway terminal 103, but does not relay the data of the other wireless apparatus 100.

Whether the wireless apparatus 100 becomes the wireless terminal 101 or a wireless repeater 102 is determined by the location of that wireless apparatus 100 on the route of the wireless network 110 (in this case, the distance from the gateway terminal 103). In a certain route, the wireless terminal 101 has the greatest distance from the gateway terminal 103, and the wireless apparatus 100 located between the wireless terminal 101 and the gateway terminal 103 is the wireless repeater 102. The wireless apparatus 100 can be either the wireless terminal 101 or the wireless repeater 102, depending on the position on the route where the own wireless apparatus is located.

In the communication system of the first embodiment, the location of the wireless apparatus 100 on this route is defined as a route cost. The route cost is determined by the wireless apparatus 100 according to its own position, such that the wireless apparatus 100 closer to the gateway terminal 103 is smaller, and far from the gateway terminal 103 is larger.

In the communication system of the first embodiment, with the above-described configuration, a plurality of wireless apparatuses 100 form the wireless network 110 by making wireless communication with each other. The communication system of the embodiment can transmit and receive with the external server, via the gateway terminal 103, application data necessary for operation, management application, and the like of devices such as robots and AGV equipped with the wireless apparatuses 100, by making multi-hop communication between the plurality of wireless apparatuses 100. Therefore, in the communication system of the embodiment, communication services can be accepted over a more flexible and wider area since the area can be formed by relay transmission by a plurality of wireless apparatuses 100 without adding communication infrastructure such as base stations to the service area.

Figure 2:
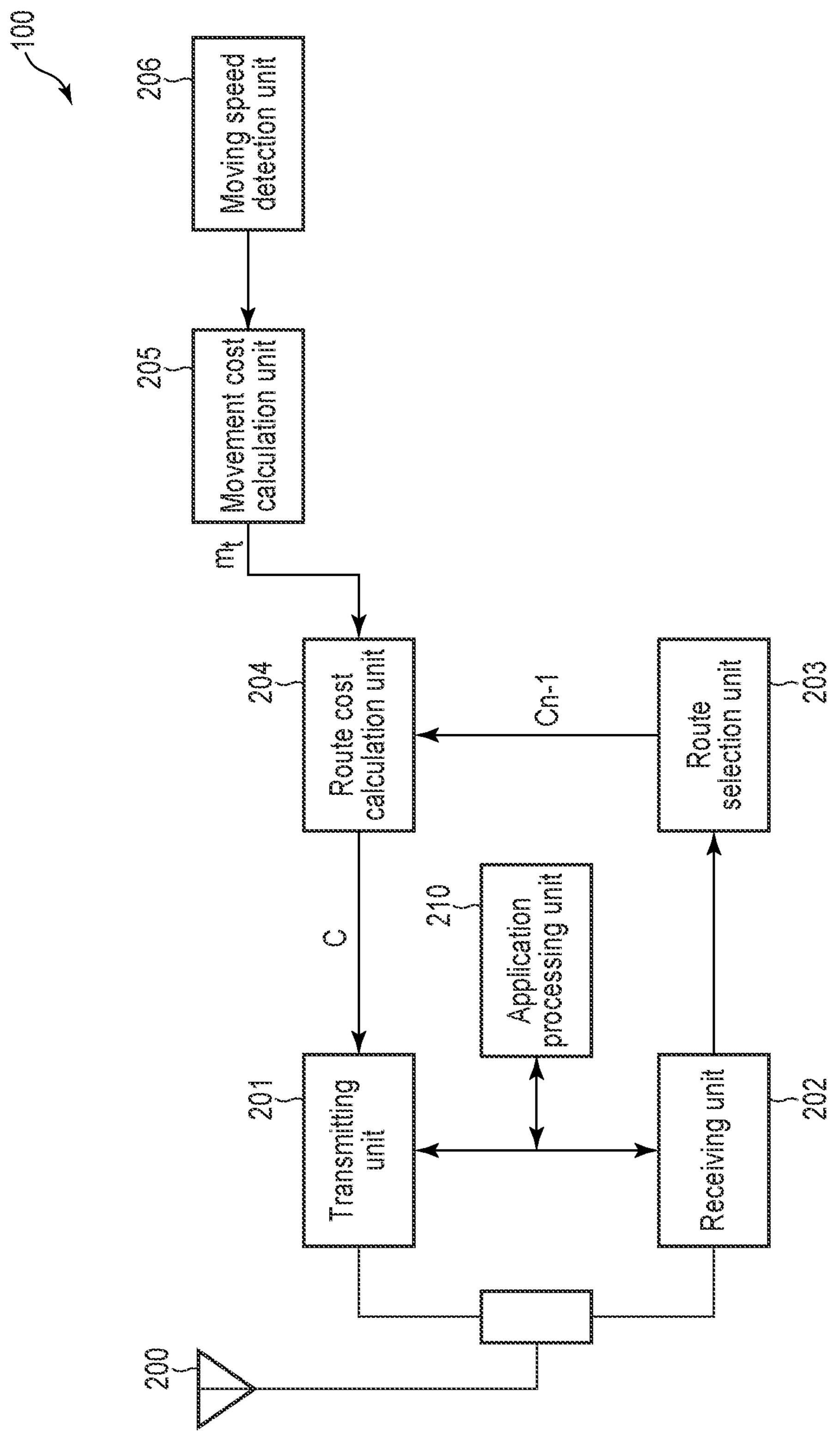
FIG. 2 is a diagram showing an example of a basic configuration of the wireless apparatus of the first embodiment.

FIG. 2 is a diagram showing a basic configuration example of the wireless apparatus 100. As described above, the wireless apparatus 100 may be a wireless terminal 101, a wireless repeater 102, or a gateway terminal 103.

The wireless apparatus 100 comprises, for example, an application processing unit 210 for executing an application (program) for operating the robot, a transmitting unit 201 and a receiving unit 202 for exchanging data necessary for executing the application with a server installed on the Internet or an intranet, an antenna 200 for transmitting and receiving wireless signals in a predetermined frequency band. In addition, the wireless apparatus 100 comprises a route selection unit 203 for acquiring route costs of neighboring wireless apparatuses from the received wireless signals and selecting an optimal connection destination, based on the route costs, and a route cost calculation unit 204 for determining the route costs of the own wireless apparatus, based on the route costs of the connection destination. The route cost information of the own wireless apparatus determined by the route cost calculation unit 204 is included in a predetermined wireless signal and transmitted wirelessly.

Furthermore, the wireless apparatus 100 of the first embodiment comprises a moving speed detection unit 206 for detecting a moving state of its own wireless apparatus. In the communication system of the first embodiment, the wireless apparatus 100 uses both the calculated movement cost and communication cost to calculate the route cost of the own wireless apparatus.

The transmitting unit 201 converts the data from the application processing unit 210 into a predetermined wireless signal and transmits the signal via the antenna 200. Furthermore, the transmitting unit 201 converts the route cost information of its own wireless apparatus, which is calculated by the route cost calculation unit 204, into a predetermined wireless signal and transmits the signal via the antenna 200.

The receiving unit 202 extracts data from the predetermined wireless signal received via the antenna 200 and passes the data to the application processing unit 210. In addition, the receiving unit 202 extracts the route cost information of peripheral wireless apparatuses from the received predetermined wireless signals and passes the information to the route selection unit 203.

The route selection unit 203 selects a wireless apparatus serving as a parent (hereinafter referred to as a parent wireless apparatus) by evaluating the route costs of the plurality of peripheral wireless apparatuses based on predetermined criteria. In general, the wireless apparatus compares the route costs acquired from the peripheral wireless apparatuses and selects the wireless apparatus that has transmitted signal at the lowest cost as the parent.

When selecting the parent wireless apparatus, the wireless apparatus 100 transmits a predetermined wireless signal to the selected parent wireless apparatus to notify that the wireless apparatus is the parent of the own wireless apparatus, and also performs a wireless connection with the parent wireless apparatus and setting of the transmission destination to set the gateway terminal as the destination, i.e., the routing setting. Therefore, the parent wireless apparatus is located at a position closer to the gateway terminal on the own wireless apparatus's route.

The moving speed detection unit 206 is hardware or software for detecting the moving speed of the own wireless apparatus, and the speed can generally be calculated from position detection using GPS, position detection using BT or indoor wireless LAN, time information at that time, and the like. In the communication system of the first embodiment, the moving speed is not directly reflected on the route cost, but is converted into a state variable $s_t$ and a forgetting factor $\omega_t$. The state variable is shown as a value acquired by normalizing the moving speed, indicating, for example, $s_t=+1$ (moving state) when the wireless apparatus 100 is moving and $s_t=-1$ (stopped state) when the wireless apparatus 100 is stopped. The forgetting factor $\omega_t$ $(0<\omega_t<1)$ is a value representing an influence which the moving speed of the wireless apparatus 100 gives to the stability of the network, and indicates a value close to 0 when the wireless apparatus 100 moves at a speed at which the network stability is sufficiently ensured, or indicates a value close to 1 when the wireless apparatus 100 moves at a speed at which the network stability cannot be sufficiently ensured.

The movement cost calculation unit 205 calculates the movement cost $m_t$ of the wireless apparatus 100 in, for example, an expression (1), using the speed information detected by the moving speed detection unit 206, i.e., the state variable $s_t$ and the forgetting factor $\omega_t$. The movement cost is calculated not only with the state variable of the current time (first time), but also with the result of multiplying the previous movement cost by a weight which is an indicator of network stability. In other words, in the communication system of the first embodiment, the movement cost is calculated not only with the movement speed of the current time (first time), but also with the result of evaluating the movement speed of the previous time (before the first time).

$$m_t = s_t + \omega_t \times m_{t-1} \quad \text{expression (1)}$$

The route cost calculation unit 204 calculates a route cost C of the own wireless apparatus from the route cost of the parent wireless apparatus, the cost per unit relay (hop), and the movement cost $m_t$ of the own wireless apparatus. The route cost of the parent wireless apparatus can be acquired by receiving a wireless signal including the route cost transmitted from the parent wireless apparatus. The cost per unit relay (hop) is a value corresponding to the number of relays starting from the gateway terminal, and is often set in advance by considering the size of the network and the network stability required by the application. When the route cost of the own wireless apparatus is referred to as $C_n$, the route cost of the parent wireless apparatus is referred to as $C_{n-1}$, and the cost per unit hop is referred to as NH, the route cost calculation unit 204 calculates the route cost of the own wireless apparatus in a manner such as expression (2).

$$C_n = C_{n-1} + NH + m_t \quad \text{expression (2)}$$

Thus, the movement cost acts to correct the route cost in the communication system of the first embodiment.

Figure 3:
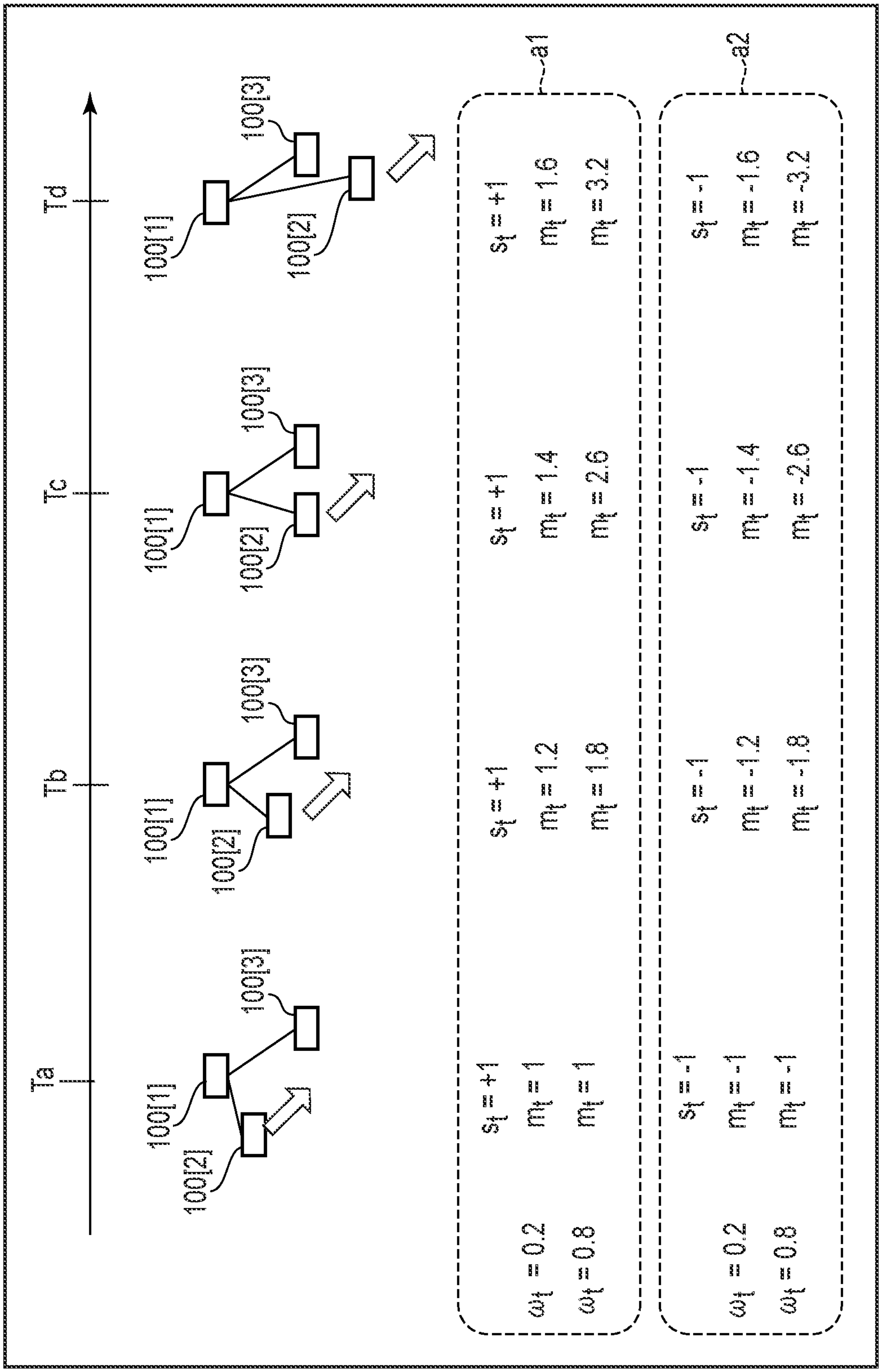
FIG. 3 is a diagram showing temporal variation of the movement cost of the wireless apparatus of the first embodiment.

FIG. 3 is a diagram showing temporal variation of the movement cost of the wireless apparatus 100.

In FIG. 3, three wireless apparatuses 100 form the wireless network 110, representing a mutual relationship among the three wireless apparatuses 100 at time Ta, time Tb, time Tc, and time Td.

Wireless apparatus 100[2] and wireless apparatus 100[3] are wirelessly connected to parent wireless apparatus 100 [1], wireless apparatus 100[3] is stopped at times Tb to Td, and wireless apparatus 100[2] is moving in a direction of an arrow at times Tb to Td.

The movement cost $m_t$ in a frame of a broken line indicated by symbol a1 is that of the wireless apparatus 100 [2], and the movement cost $m_t$ in a frame of a broken line indicated by symbol a2 is that of the wireless apparatus 100 [3].

The moving speed detection unit 206 detects that the wireless apparatus 100[2] at time Ta is moving at a certain speed, and the state variable $s_t$=+1 of the wireless apparatus 100[2] is detected. Similarly, the state variable $s_t$=+1 is also detected by the wireless apparatus 100[2] at times Tb to Td. When it is determined that the moving speed of the wireless apparatus 100[2] at times Ta to Td is small and does not hinder formation of a stable network, the moving speed detection unit 206 determines the forgetting factor $\omega_t$ to be a value close to 0 (for example, $\omega_t$=0.2). As a result, the movement cost calculation unit 205 calculates the movement cost $m_t$ of the wireless apparatus 100[2] at times Ta to Td from expression (1), for example, as shown in FIG. 4.

In contrast, when it is determined that the moving speed of the wireless apparatus 100[2] at times Ta to Td is large and hinders formation of a stable network, the moving speed detection unit 206 determines the forgetting factor $\omega_t$ to be a value close to 1 (for example, $\omega_t$=0.8). As a result, the movement cost calculation unit 205 calculates the movement cost $m_t$ of the wireless apparatus 100[2] at times Ta to Td from expression (1), for example, as shown in FIG. 5.

Comparing and referring to movement cost calculation case 1 shown in FIG. 4 and movement cost calculation case 2 shown in FIG. 5 indicates that the movement cost at a certain time is greater and the amount of temporal variation is greater as an influence of the moving speed on network stabilization is greater.

As described in the description of the route selection unit 203, since the wireless apparatus with a smaller route cost is selected as the parent, the correction amount caused by the movement cost becomes larger, in the wireless apparatus 100 which hinders the network stabilization, in the communication system of the first embodiment. As a result, since the route cost of the wireless apparatus 100 tends to be greater, the wireless apparatus 100 is less likely to be selected as a parent by the other wireless apparatuses 100.

In contrast, the moving speed detection unit 206 detects that the wireless apparatus 100[3] at time Ta is stopped, and the state variable $s_t$=−1 of the wireless apparatus 100[3] is detected. Similarly, the state variable $s_t$=−1 is also detected by the wireless apparatus 100[3] at times Tb to Td. When it is determined that the moving speed of the wireless apparatus 100[3] at the time other than times Ta to Td is large and hinders formation of a stable network, the moving speed detection unit 206 determines the forgetting factor $\omega_t$ to be a value close to 0 (for example, $\omega_t$=0.2). As a result, the movement cost calculation unit 205 calculates the movement cost $m_t$ of the wireless apparatus 100[3] at times Ta to Td from expression (1), for example, as shown in FIG. 6.

In addition, when the stop time of the wireless apparatus 100[3] including the times Ta to Td is short, the movement cost $m_t$ of the wireless apparatus 100[3] is calculated in the same manner as described above, for example, as shown in FIG. 6 since the formation of the stable network is determined to be hindered.

In contrast, when it is determined that the moving speed of the wireless apparatus 100[3] at the time other than times Ta to Td is small and does not hinder formation of a stable network, the moving speed detection unit 206 determines the forgetting factor $\omega_t$ to be a value close to 1 (for example, $\omega_t$=0.8). As a result, the movement cost calculation unit 205 calculates the movement cost $m_t$ of the wireless apparatus 100[3] at times Ta to Td from expression (1), for example, as shown in FIG. 7.

In addition, when the stop time of the wireless apparatus 100[3] including the times Ta to Td is long, the movement cost $m_t$ of the wireless apparatus 100[3] is calculated in the same manner as described above, for example, as shown in FIG. 7 since it is determined that the formation of the stable network is not hindered.

Comparing and referring to movement cost calculation case 3 shown in FIG. 6 and movement cost calculation case 4 shown in FIG. 7 indicates that when the movement and stop are repeated at a mobile station, the movement cost at a certain time is smaller and the amount of temporal variation is smaller as an influence of the moving speed at the movement on network stabilization is smaller. It can be understood that, conversely, when the influence of the moving speed on the network stabilization at the movement is greater, the movement cost at a certain time is greater and the amount of temporal variation is greater. This is expected to have the effect of providing a route cost with a smaller amount of temporal variation regardless of the current moving speed, since the travel cost is calculated by reflecting the previous moving state of the wireless apparatus 100 when the wireless apparatus stops in a moving state.

The movement cost acts to compensate for the route cost, with reference to expression (2). At the fixed station, since the stop time becomes long, movement cost is sufficiently small as compared to the mobile station. The route cost of wireless apparatus 100 [3] shows that the correction value is larger in the decreasing direction when the stop time is longer and the influence of the moving speed on the network stabilization is larger.

As described in the description of the route selection unit 203, since a wireless apparatus with a smaller route cost is selected as the parent, the route cost tends to be smaller as the stop time is longer, and the wireless apparatus can easily be selected as the parent by the other wireless apparatuses 100, in the communication system of the first embodiment. In addition, in a situation where the wireless apparatus 100 repeats moving and stopping, the wireless apparatus 100 which has a large speed at the movement and hinders the network stabilization may interfere with the network stabilization at the stop time. In the communication system of the first embodiment, it is possible to reduce the amount of correction based on the movement cost after a certain time from the stop, by considering the amount of influence on the network stabilization caused by the movement. As a result, the route cost of the wireless apparatus 100 shows a tendency to become smaller, the wireless apparatus can easily be selected as a parent by the other wireless apparatuses 100.

As described above, in the communication system of the first embodiment, the wireless apparatus 100 can detect the own moving speed, calculate the movement cost by combining the detection results of previous moving speeds, and calculate the route cost of the wireless apparatus 100 according to the degree of influence on the network stability. Therefore, in the wireless network 110 using the wireless apparatus 100, since the route cost is controlled to an appropriate value according to the moving speed and frequency of movement of the wireless apparatus 100, maintenance and improvement network stability can be expected in a wireless mesh network where fixed stations and mobile stations are mixed together.

Figure 8:
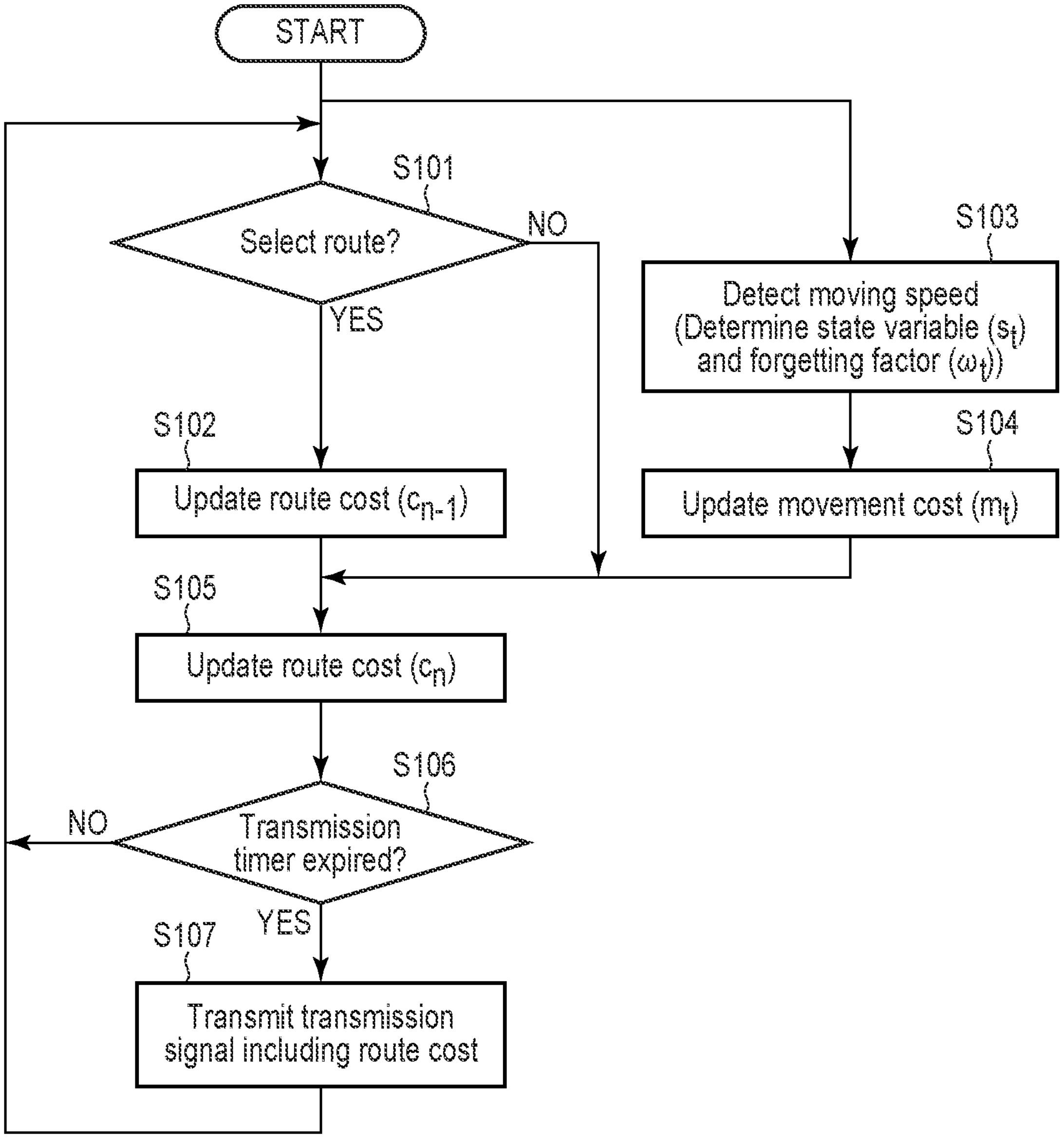
FIG. 8 is a flowchart showing a process flow in which the wireless apparatus of the first embodiment notifies the other wireless apparatuses in the wireless network of the route cost of the own wireless apparatus.

The wireless apparatus 100 maintains the own route cost at any time and periodically transmits the route cost by wireless signals to notify the other wireless apparatus 100 in the wireless network 110. This process will be described with reference to FIG. 8.

After the wireless apparatus 100 is powered on, the wireless apparatus 100 activates a predetermined wireless system. After that, the wireless apparatus 100 receives wireless signals transmitted wirelessly from the surrounding wireless apparatuses and extracts the route costs of the surrounding wireless apparatuses 100 from the wireless signals. The wireless apparatus 100 compares and evaluates a plurality of route costs and selects the wireless apparatus with the smallest route cost as the parent (S101: YES). In other words, the route selection or reselection is performed. If the route costs of the surrounding wireless apparatuses 100 are greater than the route cost of the own wireless apparatus, the wireless apparatus 100 does not execute route reselection (S101: NO).

If the wireless apparatus 100 executes route selection (selection of the parent wireless apparatus) or route reselection (selection of another wireless apparatus) and if there is a change in the route cost $C_{n-1}$ of the parent wireless apparatus, the wireless apparatus 100 updates the route cost of the own wireless apparatus (S102).

In addition, concurrently with the processes related to the route selection or reselection (steps S101 and S102), the wireless apparatus 100 determines the state variable $s_t$ and the forgetting factor $\omega_t$ from the moving speed (S103) and calculates the movement cost $m_t$ at the current time from expression (1) together with the previous movement costs (S104).

The wireless apparatus 100 updates the route cost of the own wireless apparatus from expression (2) by combining the above-calculated movement cost, the route cost of the parent wireless apparatus, and the cost of the next hop (S105).

The calculation of the movement cost may be performed independently of the determination of route selection performed by the wireless apparatus 100, and thus, the route cost is updated in accordance with changes in the state of the wireless apparatus 100, such as moving, stopping, and the like, in the wireless apparatus 100 of the first embodiment.

In order for the wireless apparatus 100 to periodically notify the other wireless apparatuses 100 in the wireless network 110 of the route cost, a timer may generally be provided in the wireless apparatus 100. In this case, the wireless apparatus 100 confirms whether the timer has expired and, if the timer has expired (S106: YES), the wireless apparatus 100 resets the timer and transmits a predetermined wireless signal including the route cost (S107). If the timer has not expired (S106: NO), the wireless apparatus 100 does not transmit the route cost and returns to the determination of route selection.

In addition, if there is a request from surrounding wireless apparatuses to inquire about the route cost, the wireless apparatus 100 may transmit a predetermined wireless signal including the route cost, regardless of whether the timer has expired or not.

As described above, in the communication system of the first embodiment, since the wireless apparatus 100 can autonomously update the movement cost, the state of the wireless apparatus 100 can always be reflected on the route cost regardless of the timing of route selection, enabling the construction of the stable wireless network 110 in accordance with the state of the wireless apparatus.

Figure 9:
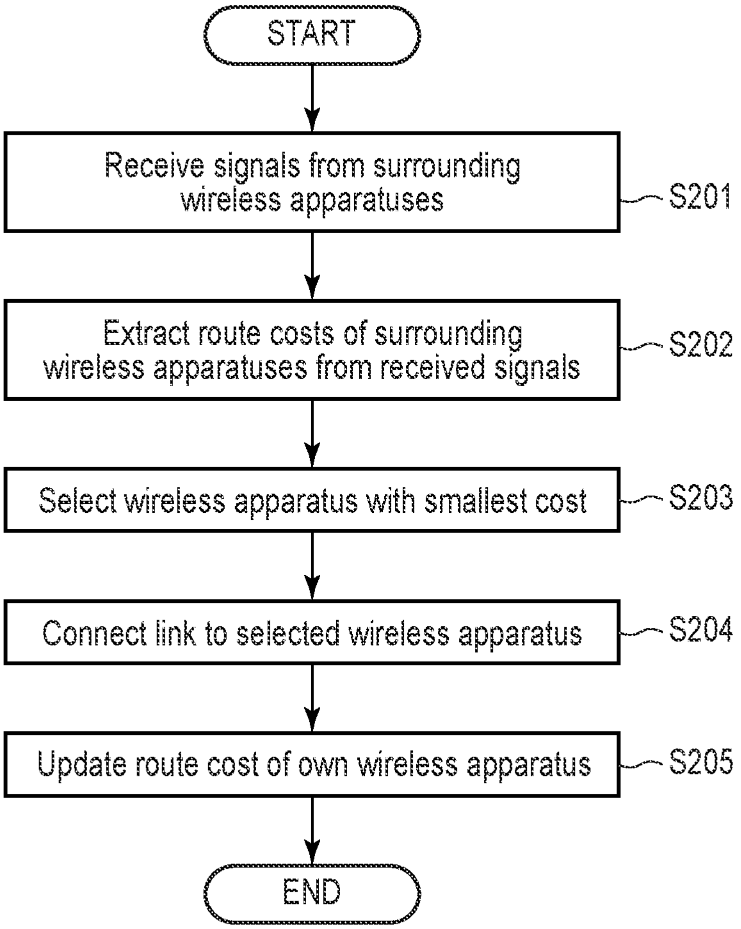
FIG. 9 is a flowchart showing a flow of a route selection process of the wireless apparatus of the first embodiment.

Next, the route selection process of the wireless apparatus 100 will be described with reference to FIG. 9.

After the wireless apparatus 100 is powered on, the wireless apparatus 100 activates a predetermined wireless system. After that, the wireless apparatus 100 receives wireless signals transmitted wirelessly from the surrounding wireless apparatuses (S201) and extracts the route costs of the surrounding wireless apparatuses 100 from the wireless signals (S202). The wireless apparatus 100 compares and evaluates a plurality of extracted route costs and selects the wireless apparatus 100 with the smallest route cost as the parent (S203). Then, the wireless apparatus 100 performs the connection procedure of the wireless link to the parent wireless apparatus 100 according to a predetermined procedure (S204). If there is any change in the route cost $C_{n-1}$ of the parent wireless apparatus, the wireless apparatus 100 updates the route cost of the own wireless apparatus, based on the route cost of the next hop, the route cost $C_{n-1}$ of the parent wireless apparatus, and the movement cost of the own wireless apparatus (S205).

As described above, in the communication system of the first embodiment, since the wireless apparatus collects and compares the route costs from the surrounding wireless apparatuses and then the wireless apparatus 100 with the lowest route cost including the movement cost at that time can be selected as the parent, the stable wireless network 110 can be constructed in accordance with the state of the wireless apparatus 100.

In other words, the communication system of the first embodiment does not need to comprise a table and can adaptively calculate the route cost with a small amount of temporal variation.

Second Embodiment

Next, the second embodiment will be described.

Figure 10:
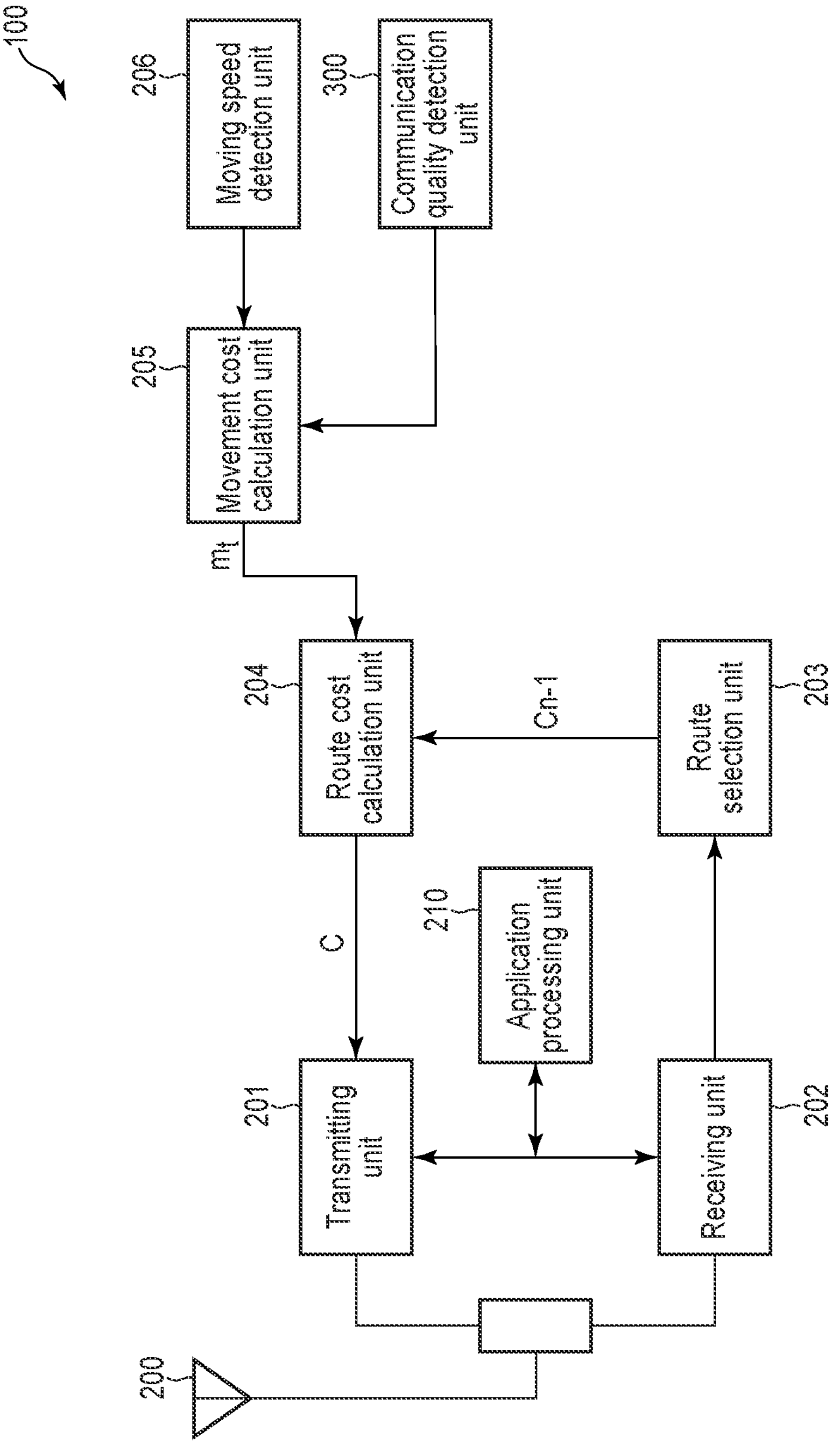
FIG. 10 is a diagram showing an example of a configuration of a wireless apparatus of a second embodiment.

FIG. 10 is a diagram showing a configuration example of a wireless apparatus 100 according to a second embodiment. Incidentally, the same constituent elements as those of the first embodiment will be denoted by the same symbols, and their descriptions will be omitted.

As shown in FIG. 10, the wireless apparatus 100 of the second embodiment further comprises a communication quality detection unit 300 that detects the quality of communication with a connection destination, in addition to the configuration of the wireless apparatus 100 of the first embodiment (see FIG. 2).

The communication quality detection unit 300 measures the communication quality in a wireless link between the parent wireless apparatus and the own wireless apparatus. The measured communication quality is indicated by, for example, the power received from the parent wireless apparatus, the number of retransmissions of wireless signals, and the like. In the communication system of the second embodiment, the communication quality is converted into a forgetting factor $\omega_q$. The forgetting factor $\omega_q$ ($0<\omega_q<1$) is a value representing an influence which the communication quality of the wireless apparatus 100 gives to the stability of the network, and calculates a value close to 0 when the communication quality can sufficiently ensure the network stability, or calculates a value close to 1 when the communication quality cannot sufficiently ensure the network stability.

The calculated forgetting factor $\omega_q$ becomes the input of the movement cost calculation unit 205 and is reflected as the forgetting factor of the movement cost, as indicated by expression (3).

$$m_t = s_t + \omega_q \times \omega_t \times m_{t-1} \quad \text{expression (3)}$$

The calculated forgetting factor $\omega_q$ acts such that the correction range of the route cost becomes smaller when the communication quality is good, and that the correction range of the route cost becomes larger when the communication quality is poor.

This reflects the fact that when the communication quality is good, the influence on the network stability, which results from the moving speed, is mitigated even if the moving speed is large. Conversely, when the communication quality is poor, the influence on the network stability, which results from the moving speed, is increased even if the moving speed is small.

As described above, in the communication system of the second embodiment, since the wireless apparatus 100 collects and compares the route costs from the surrounding wireless apparatuses and then the wireless apparatus 100 with the lowest route cost including the movement cost at that time can be selected as the parent, the stable wireless network 110 can be constructed in accordance with the state of the wireless apparatus 100.

Figure 11:
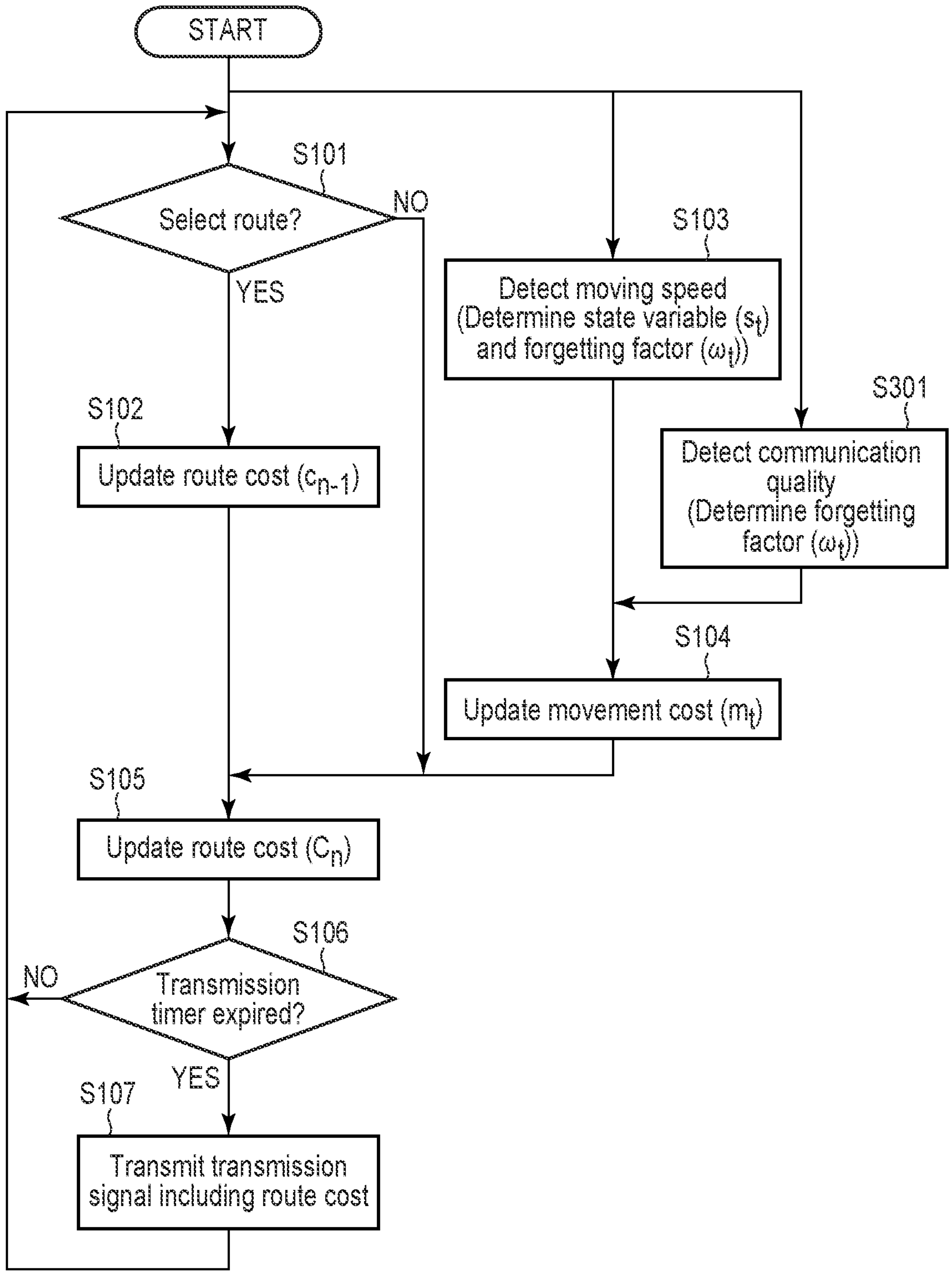
FIG. 11 is a flowchart showing a process flow in which the wireless apparatus of the second embodiment notifies the other wireless apparatuses in the wireless network of the route cost of the own wireless apparatus.

FIG. 11 is a flowchart showing a process flow in which the wireless apparatus 100 of the second embodiment notifies the other wireless apparatuses 100 in the wireless network 110 of the route cost of the own wireless apparatus.

As described above, concurrently with the processes related to the route selection or reselection (steps S101 and S102), the wireless apparatus 100 of the first embodiment determines the state variable $s_t$ and the forgetting factor $\omega_t$ from the moving speed (S103). In contrast, concurrently with these, the wireless apparatus 100 of the second embodiment further detects the communication quality and converts the communication quality into the forgetting factor $\omega_q$ in parallel with these (S301). Then, the wireless apparatus 100 of the second embodiment performs the updating process of the movement cost (S104) according to the expression (3).

As described above, in the communication system of the second embodiment, the wireless apparatus 100 autonomously executes updating the movement cost by considering the communication cost, enabling the construction of a more stable wireless network 110 in accordance with the state of the wireless apparatus 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless apparatus comprising:

a processing unit configured to calculate a route cost between a first other wireless apparatus and an own wireless apparatus in accordance with a number of hops and a first movement cost of the own wireless apparatus, the number of hops being a number of relays of wireless signals by a second other wireless apparatus that can intervene as a wireless repeater between the first other wireless apparatus operating as a gateway terminal and the own wireless apparatus operating as a wireless terminal; and a communication unit configured to transmit first route cost information on the route cost to a third other wireless apparatus that is selecting a connection destination for wireless communication with the first other wireless apparatus, wherein:

the processing unit is configured to calculate the first movement cost at a first time, based on a first speed of the own wireless apparatus at the first time and a second movement cost at a time before the first time, after calculating the first movement cost corresponding to the first time, the processing unit is configured to:

acquire a second speed of the own wireless apparatus corresponding to a second time, and calculate a third movement cost corresponding to the second time, based on the first movement cost and the second speed, and the first, second, and third movement costs become smaller when the own wireless apparatus is in a stopped state or become larger when the own wireless apparatus is in a moving state.

2. The wireless apparatus of claim 1, wherein the processing unit is configured to update the first movement cost as time elapses, such that the first movement cost becomes large when a movement time is long or becomes small when the movement time is short, based on a speed of the own wireless apparatus at the first time and a product of the first movement cost at a certain time before the first time.

3. The wireless apparatus of claim 1, wherein the communication unit is configured to:

receive second route cost information on a route cost from each of the first to other wireless apparatus, the second other wireless apparatus, the third other wireless apparatus, and a fourth other wireless apparatus, and select a connection destination, based on the second route cost information.

4. A communication system comprising:

a plurality of the wireless apparatuses of claim 1, wherein a wireless network is formed by the plurality of the wireless apparatuses wirelessly communicating with one another.

5. A communication system comprising:

a plurality of the wireless apparatuses of claim 2, wherein a wireless network is formed by the plurality of the wireless apparatuses wirelessly communicating with one another.

6. A communication system comprising:

a plurality of the wireless apparatuses of claim 4, wherein a wireless network is formed by the plurality of the wireless apparatuses wirelessly communicating with one another.

7. A route cost calculation method performed by each of wireless apparatuses forming a wireless network by wirelessly communicating with one another, the method comprising:

calculating a route cost between a first other wireless apparatus and an own wireless apparatus in accordance with a number of hops and a first movement cost of the own wireless apparatus, the number of hops being a number of relays of wireless signals by a second other wireless apparatus that can intervene as a wireless repeater between a first other wireless apparatus operating as a gateway terminal and the own wireless apparatus operating as a wireless terminal; and transmitting first route cost information on the route cost to a third other wireless apparatus that is selecting a connection destination for wireless communication with the first other wireless apparatus, wherein:

the calculating the route cost includes calculating the first movement cost at a first time, based on a first speed of the own wireless apparatus at the first time and a second movement cost at a time before the first time, after calculating the first movement cost corresponding to the first time, the calculating the route cost includes:

acquiring a second speed of the own wireless apparatus corresponding to a second time, and calculating a third movement cost corresponding to the second time, based on the first movement cost and the second speed, and the first, second, and third movement costs become smaller when the own wireless apparatus is in a stopped state or become larger when the own wireless apparatus is in a moving state.

8. The route cost calculation method of claim 7, wherein the calculating the route cost includes updating the first movement cost as time elapses, such that the first movement cost becomes large when a movement time is long or becomes small when the movement time is short, based on a speed of the own wireless apparatus at the first time and a product of the first movement cost at a certain time before the first time.

9. The route cost calculation method of claim 7, wherein the calculating the route cost includes:

receiving second route cost information on a route cost from each of the first other wireless apparatus, the second other wireless apparatus, the third other wireless apparatus, and a fourth other wireless apparatus, and selecting a connection destination, based on the second route cost information.

10. A non-transitory computer-readable storage medium having stored thereon a computer program which is executable by each of wireless apparatuses forming a wireless network by wirelessly communicating with one another, the computer program controlling the computer to execute functions comprising:

calculating a route cost between a first other wireless apparatus and an own wireless apparatus in accordance with a number of hops and a first movement cost of the own wireless apparatus, the number of hops being a number of relays of wireless signals by a second other wireless apparatus that can intervene as a wireless repeater between a first other wireless apparatus operating as a gateway terminal and the own wireless apparatus operating as a wireless terminal; and transmitting first route cost information on the route cost to a third other wireless apparatus that is selecting a connection destination for wireless communication with the first other wireless apparatus, wherein:

the calculating the route cost includes calculating the first movement cost at a first time, based on a first speed of the own wireless apparatus at the first time and a second movement cost at a time before the first time, after calculating the first movement cost corresponding to the first time, the calculating the route cost includes:

acquiring a second speed of the own wireless apparatus corresponding to a second time, and calculating a third movement cost corresponding to the second time, based on the first movement cost and the second speed, and the first, second, and third movement costs become smaller when the own wireless apparatus is in a stopped state or become larger when the own wireless apparatus is in a moving state.

11. The storage medium of claim 10, wherein the calculating the route cost includes updating the first movement cost as time elapses, such that the first movement cost becomes large when a movement time is long or becomes small when the movement time is short, based on a speed of the own wireless apparatus at the first time and a product of the first movement cost at a certain time before the first time.

12. The storage medium of claim 10, wherein the calculating the route cost includes;

receiving second route cost information on a route cost from each of the first other wireless apparatus, the second other wireless apparatus, the third other wireless apparatus, and a fourth other wireless apparatus, and selecting a connection destination, based on the second route cost information.

13. The wireless apparatus of claim 1, wherein when the own wireless apparatus is in a moving state, the first movement cost at a high speed is greater than the first movement cost at a low speed.

14. The wireless apparatus of claim 1, wherein when the own wireless apparatus is in a stopped state, the first movement cost when a movement speed is high during a predetermined period prior to the first time is greater than the first movement cost when the movement speed is low.

15. The wireless apparatus of claim 1, wherein when the own wireless apparatus is in a stopped state, the first movement cost is lower when a stop time is long than when the stop time is short.

* * * * *